United States Patent
Anniss, III et al.

(10) Patent No.: US 12,459,805 B2
(45) Date of Patent: Nov. 4, 2025

(54) SYSTEM AND METHOD FOR AUTOMATIC MATERIAL DISPENSING

(71) Applicant: Electrolux Home Products, Inc., Charlotte, NC (US)

(72) Inventors: William T. Anniss, III, Anderson, SC (US); William Schenk, Anderson, SC (US); John T. Campbell, Pendleton, SC (US); Raony Barrios, Anderson, SC (US)

(73) Assignee: Electrolux Consumer Products, Inc., Charlotte, NC (US)

( * ) Notice: Subject to any disclaimer, the term of this patent is extended or adjusted under 35 U.S.C. 154(b) by 0 days.

(21) Appl. No.: 18/323,470

(22) Filed: May 25, 2023

(65) Prior Publication Data

US 2024/0391752 A1   Nov. 28, 2024

(51) Int. Cl.
 *F25D 29/00* (2006.01)
 *B67D 3/00* (2006.01)
 *G01G 15/02* (2006.01)

(52) U.S. Cl.
 CPC ........... *B67D 3/0025* (2013.01); *F25D 29/00* (2013.01); *G01G 15/02* (2013.01); *F25D 2500/06* (2013.01); *F25D 2700/06* (2013.01); *G01G 2015/022* (2013.01)

(58) Field of Classification Search
 CPC .. B67D 3/0025; F25D 2700/06; G01G 15/02; G01G 2015/022
 USPC .................................................. 141/83, 359
 See application file for complete search history.

(56) References Cited

U.S. PATENT DOCUMENTS

| 10,837,698 B2 | 11/2020 | Choy et al. |
| 10,935,310 B2 | 3/2021 | Junge et al. |
| 2012/0012224 A1* | 1/2012 | Haeuslmann ........... B67C 3/202 141/83 |

(Continued)

FOREIGN PATENT DOCUMENTS

| KR | 2009/0020951 | 2/2009 |
| KR | 2021/0015470 | 2/2021 |

(Continued)

OTHER PUBLICATIONS

International Search Report and Written Opinion for PCT/US/2024/029644 dated Sep. 10, 2024, 44 pages.

*Primary Examiner* — Jason K Niesz
(74) *Attorney, Agent, or Firm* — Chrisman Gallo Tochtrop LLC

(57) ABSTRACT

A refrigerator appliance includes a drip tray cover including two strain gauge sensors that are coupled to a bottom surface thereof; a memory; and a controller. The controller is configured to detect, via the two strain gauge sensors, a weight of a vessel on the drip tray cover based on a strain; receive, via input, one or more selections, the one or more selections indicative of an amount of material to be dispensed into the vessel, the material including liquid, ice, or any combination thereof; dispensing the material in accordance with the one or more selections; continuously measure, via the two strain gauge sensors, the amount of material being dispensed in accordance with the one or more selections; and terminate, after the vessel receives the amount of material that is measured and equivalent to the one or more selections, the dispensing of the material into the vessel.

20 Claims, 6 Drawing Sheets

(56) References Cited

U.S. PATENT DOCUMENTS

| | | | |
|---|---|---|---|
| 2014/0053946 A1* | 2/2014 | Geier | B65G 33/26 |
| | | | 141/83 |
| 2016/0114301 A1 | 4/2016 | Japlonski | |
| 2017/0167783 A1 | 6/2017 | Jeong | |
| 2017/0241701 A1 | 8/2017 | Lee | |
| 2019/0017736 A1 | 1/2019 | Temizkan | |
| 2020/0182533 A1 | 6/2020 | Scalf | |
| 2020/0377357 A1* | 12/2020 | Naik | F25C 5/22 |

FOREIGN PATENT DOCUMENTS

| | | |
|---|---|---|
| KR | 20220087808 | 6/2022 |
| WO | 2007/144011 | 12/2007 |
| WO | 2009/051346 | 4/2009 |

\* cited by examiner

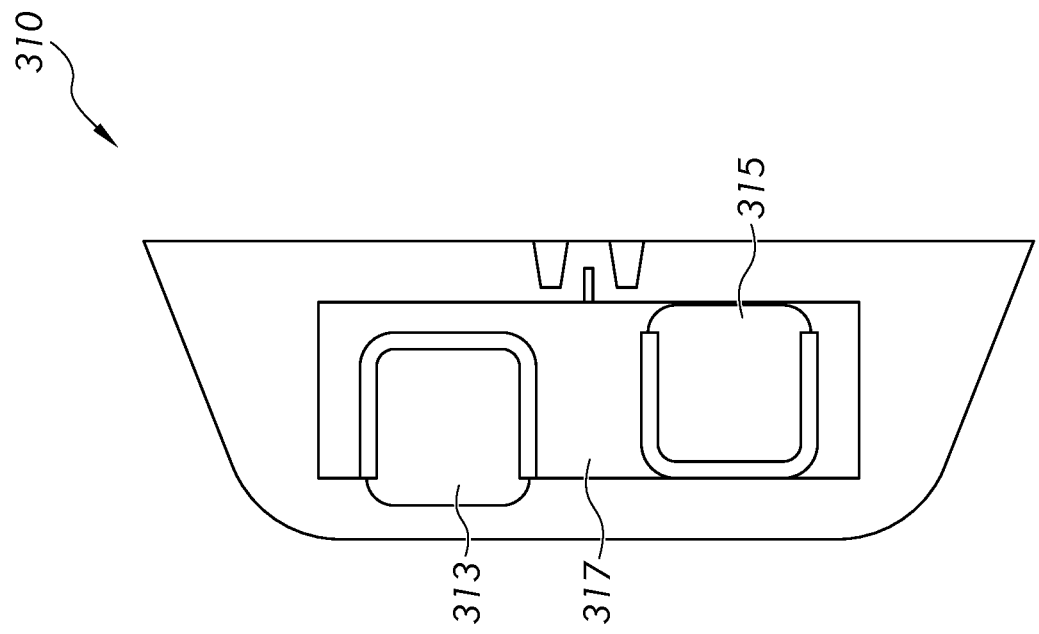

SYSTEM AND METHOD FOR AUTOMATIC MATERIAL DISPENSING

FIELD OF THE INVENTION

This application relates generally to a refrigerator appliance including an automatic dispenser, and more particularly, to a refrigerator appliance including an automatic dispenser for material dispensing of a fixed amount of material into a vessel.

BACKGROUND OF THE INVENTION

Refrigerator appliances that include water dispensers are often manually-actuated dispensers. Some automatic systems involve measuring a flow rate of water and the proximity of water from the top of the vessel to determine the time or volume of the water and/or ice to be dispensed for the measurement, but these systems are cumbersome and complicated. In addition, flowmeters are costly contain several moving parts that may cause reliability concerns, which yields reduced refrigerator appliance operational efficiency.

BRIEF SUMMARY OF THE INVENTION

The following presents a simplified summary of the disclosure in order to provide a basic understanding of some example aspects described in the detailed description. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later. It is to be appreciated that various embodiments are disclosed herein, and that any feature(s) of a particular embodiment may be used interchangeably in any other embodiment. That is, the embodiments are not intended to be mutually exclusive and the features of each embodiment may be utilized in various combinations with some or all of the features of another embodiment.

In accordance with one aspect, there is provided a refrigerator appliance including a drip tray cover, a memory, and a controller. The drip tray cover may comprise two strain gauge sensors. The two strain gauge sensors may be coupled to a bottom surface of the drip tray cover. The controller may be configured to detect, via the two strain gauge sensors, a weight of a vessel on the drip tray cover based on a strain of the drip tray cover. The controller may be configured to receive, via input, one or more selections. The one or more selections may be indicative of an amount of material to be dispensed into the vessel. The material may include liquid, ice, or any combination thereof. The controller may be configured to dispense the material in accordance with the one or more selections. The controller may be configured to continuously measure, via the two strain gauge sensors, the amount of material being dispensed in accordance with the one or more selections. The controller may be configured to terminate, after the vessel receives the amount of material that is measured and equivalent to the one or more selections, the dispensing of the material into the vessel.

In one embodiment, the two strain gauge sensors may be mounted in respective pockets of the bottom surface of the drip tray cover.

In one embodiment, the controller may be further configured to calibrate, prior to dispensing the material in accordance with the one or more selections, a scale associated with the drip tray cover that measures the weight of the vessel.

In one embodiment, the controller may be further configured to actuate a valve to begin dispensing of the water into the vessel in accordance with the one or more suggestions.

In one embodiment, the refrigerator appliance may further comprise a dispenser and an ice dispenser device that are located in a pocket and are also disposed above drip tray cover.

In one embodiment, a first strain gauge sensor is disposed in an opposite direction to a second strain gauge sensor.

In one embodiment, a first strain gauge sensor is disposed in the same direction as a second strain gauge sensor.

In one embodiment, the refrigerator appliance may further comprise a user interface that is configured to display and receive the one or more selections.

In one embodiment, the input of the one or more selections includes biometric input, haptic input, or any combination thereof.

In accordance with yet another aspect, there is provided a method of automatic material dispensing. The method may include detecting, via two strain gauge sensors, a weight of a vessel on a drip tray cover based on a strain of the drip tray cover. The two strain gauge sensors may be coupled to a bottom surface of the drip tray cover. The method may include receiving input of one or more selections. The one or more selections may be indicative of an amount of material to be dispensed into the vessel. The material may include liquid, ice, or any combination thereof. The method may include actuating a valve to begin dispensing the material in accordance with the one or more selections. The method may include continuously measuring, via the two strain gauge sensors, the amount of material being dispensed in accordance with the one or more selections. The method may include terminating, after the vessel receives the amount of material that is measured and equivalent to the one or more selections, the dispensing of the material into the vessel.

In one embodiment, the two strain gauge sensors may be mounted in respective pockets of the bottom surface of the drip tray cover.

In one embodiment, the method may further comprise calibrating, prior to dispensing the material in accordance with the one or more selections, a scale associated with the drip tray cover that measures the weight of the vessel.

In one embodiment, the method may further comprise at least one of, in accordance with the one or more selections: dispensing water by a dispenser, and dispensing ice pieces by an ice dispenser device.

In one embodiment, the method may further comprise actuating a valve to begin the dispensing, by a dispenser, of the water into the vessel in accordance with the one or more selections.

In one embodiment, a first strain gauge sensor is disposed in an opposite direction to a second strain gauge sensor.

In one embodiment, a first strain gauge sensor is disposed in the same direction as a second strain gauge sensor.

In one embodiment, the drip tray cover may be arranged above a sump that is located at a bottom of the dispenser.

In one embodiment, the method may further comprise displaying and receiving the input via a user interface.

In one embodiment, the input of the one or more selections includes biometric input, haptic input, or any combination thereof.

In accordance with still another aspect, there is provided a computer readable storage medium comprising computer program code instructions, being executable by a computer, for: detecting a weight of a vessel on a drip tray cover via two strain gauge sensors based on a strain of the drip tray cover, the two strain gauge sensors coupled to a bottom surface of the drip tray cover via a rigid plate, for example a metal plate; receiving input of one or more selections, the one or more selections indicative of an amount of material to be dispensed into the vessel, the material including liquid, ice, or any combination thereof; dispensing the material in accordance with the one or more selections; continuously measuring the amount of material being dispensed in accordance with the one or more selections; and terminating, after the vessel receives the amount of material that is measured and equivalent to the one or more selections, dispensing of the material into the vessel.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure and together with the description serve to explain the principles and operations thereof.

BRIEF DESCRIPTION OF THE DRAWINGS

These and other features, aspects and advantages of the present disclosure can be further understood when read with reference to the accompanying drawings:

FIG. 5A is a plan view of a cover according to an example embodiment;

FIG. 5B is a bottom plan view of the cover of FIG. 5A according to an example embodiment;

DESCRIPTION OF EXAMPLE EMBODIMENTS

Figure 1:
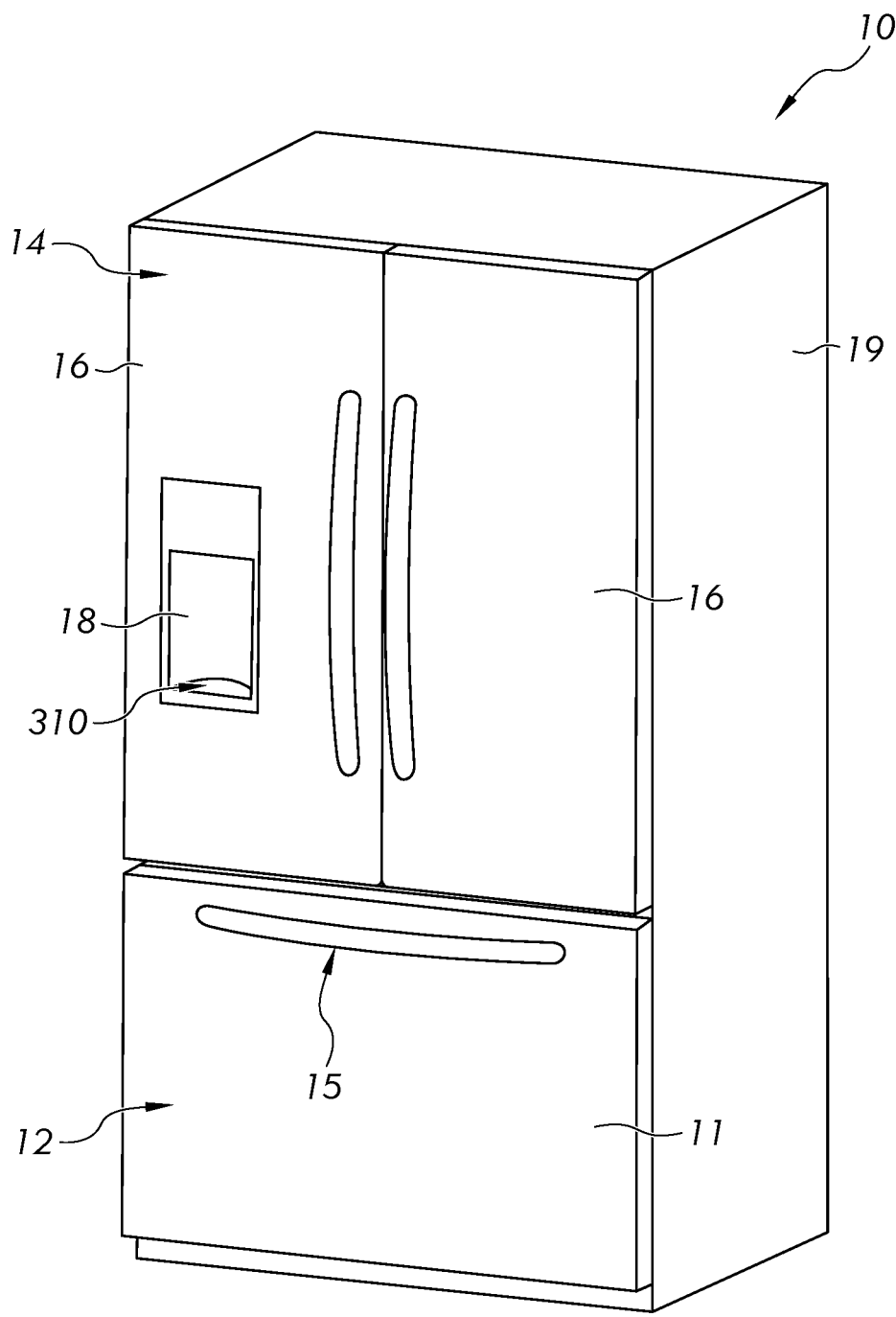
FIG. 1 is a front perspective view of a household French Door Bottom Mount refrigerator wherein doors of the refrigerator are in a closed position according to an example embodiment.

Apparatus will now be described more fully hereinafter with reference to the accompanying drawings in which embodiments of the disclosure are shown. Whenever possible, the same reference numerals are used throughout the drawings to refer to the same or like parts. However, this disclosure may be embodied in many different forms and should not be construed as limited to the embodiments set forth herein. It is to be appreciated that various embodiments are disclosed herein, and that any feature(s) of a particular embodiment may be used interchangeably in any other embodiment. That is, the embodiments are not intended to be mutually exclusive and the features of each embodiment may be utilized in various combinations with some or all of the features of another embodiment.

The systems and methods disclosed herein are directed to automatic sensor-based techniques using strain gauges or load cells to fill a vessel with ice, water, and/or any combination thereof. The strain gauges or load cells may be disposed in a pocket, such as a water dispenser pocket, of a refrigerator appliance. The systems and methods are configured to measure the vessel, and effectuate the timing of a water dispenser valve and/or ice dispenser device that switches on and off to fill the vessel is based on one or more calculations. The automatic water and/or ice dispensing is based on a calibrated variable, as further discussed below, provides a user the convenience of filling the vessel automatically without having to worry about the concern of overflow of the vessel. In this manner, the flowrate of the water is no longer needed to be measured by an inline flowmeter.

Referring now to the drawings, FIG. 1 shows a refrigeration appliance in the form of a domestic refrigerator, indicated generally at 10. Although the detailed description that follows concerns a domestic refrigerator 10, the invention can be embodied by refrigeration appliances other than with a domestic refrigerator 10. Further, an embodiment is described in detail below, and shown in the figures as a bottom-mount configuration of a refrigerator 10, including a fresh food storage compartment 14 disposed vertically above a freezer storage compartment 12. However, the refrigerator 10 can have any desired configuration including at least one of a fresh food storage compartment 14 and/or a freezer storage compartment 12, such as a top mount refrigerator (freezer disposed above the fresh food compartment), a side-by-side refrigerator (fresh food compartment is laterally next to the freezer compartment), a standalone refrigerator or freezer having a single main compartment, etc.

Figure 2:
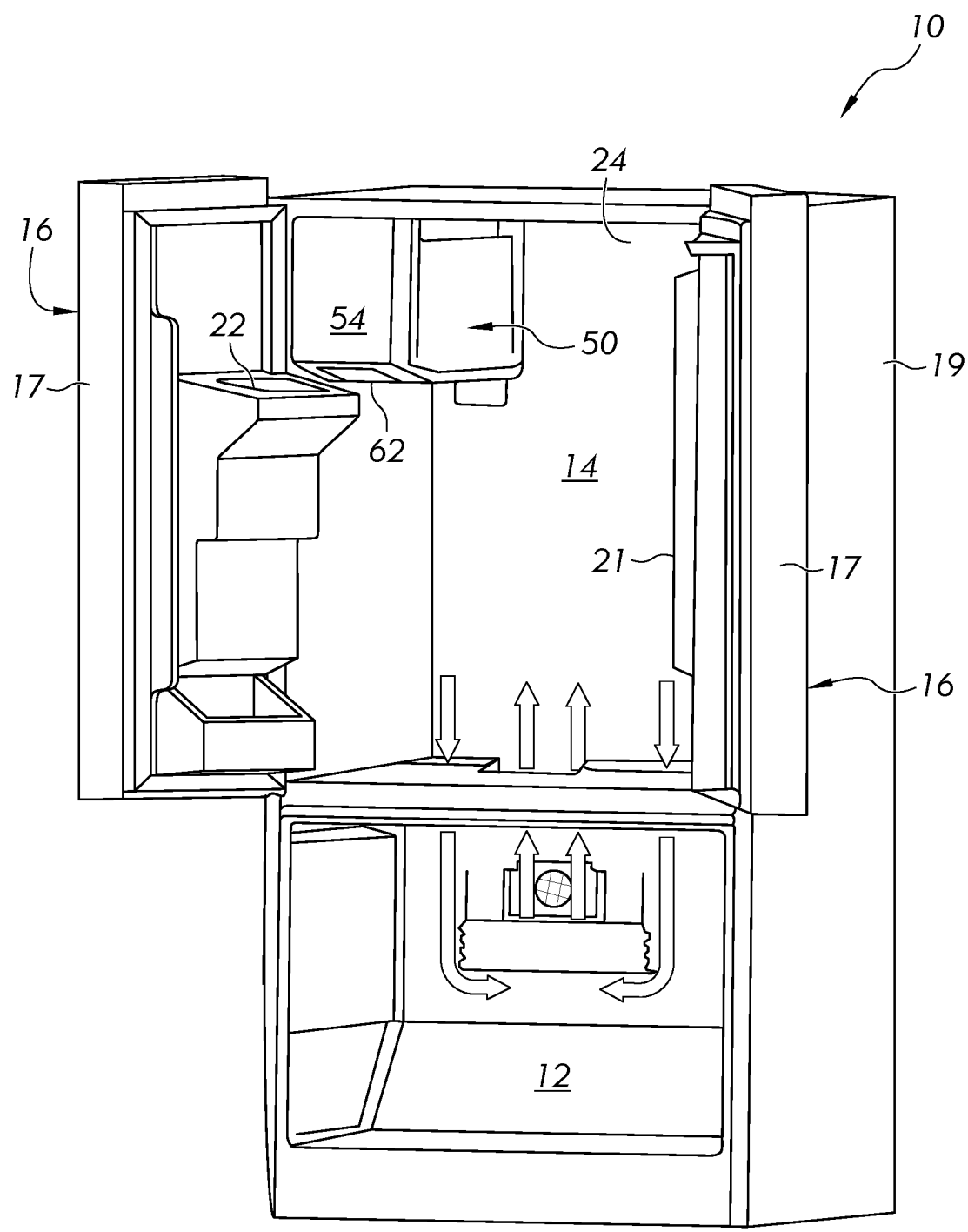
FIG. 2 is a front perspective view of the refrigerator of FIG. 1 showing the doors in an opened position and an interior of a fresh food compartment according to an example embodiment.

One or more doors 16 shown in FIG. 1 are pivotally coupled to a cabinet 19 of the refrigerator 10 to restrict and grant access to the fresh food storage compartment 14. The door 16 can include a single door that spans the entire lateral distance across the entrance to the fresh food storage compartment 14, or can include a pair of French-type doors 16 as shown in FIG. 1 that collectively span the entire lateral distance of the entrance to the fresh food storage compartment 14 to enclose the fresh food storage compartment 14. For the latter configuration, a center flip mullion 21 (FIG. 2) is pivotally coupled to at least one of the doors 16 to establish a surface against which a seal provided to the other one of the doors 16 can seal the entrance to the fresh food storage compartment 14 at a location between opposing side surfaces 17 (FIG. 2) of the doors 16. The mullion 21 can be pivotally coupled to the door 16 to pivot between a first orientation that is substantially parallel to a planar surface of the door 16 when the door 16 is closed, and a different orientation when the door 16 is opened. The externally-exposed surface of the center mullion 21 is substantially parallel to the door 16 when the center mullion 21 is in the first orientation, and forms an angle other than parallel relative to the door 16 when the center mullion 21 is in the second orientation. The seal and the externally-exposed surface of the mullion 21 cooperate approximately midway between the lateral sides of the fresh food storage compartment 14.

A dispenser 18 (FIG. 1) for dispensing at least water, and optionally ice pieces, can be provided on an exterior of one of the doors 16 that restricts access to the fresh food storage compartment 14. The dispenser 18 includes an actuator (e.g., lever, switch, proximity sensor, etc.) to cause frozen ice pieces to be dispensed from an ice bin 54 (FIG. 2) of an ice maker 50 disposed within the fresh food storage compartment 14. Ice pieces from the ice bin 54 can exit the ice bin 54 through an aperture 62 and be delivered to the dispenser 18 via an ice chute 22 (FIG. 2), which extends at least partially through the door 16 between the dispenser 18 and the ice bin 54.

Referring to FIG. 1, the freezer storage compartment 12 is arranged vertically beneath the fresh food storage compartment 14. A drawer assembly (not shown) including one or more freezer baskets (not shown) can be withdrawn from the freezer storage compartment 12 to grant a user access to food items stored in the freezer storage compartment 12. The drawer assembly can be coupled to a freezer door 11 that includes a handle 15. When a user grasps the handle 15 and pulls the freezer door 11 open, at least one or more of the freezer baskets is caused to be at least partially withdrawn from the freezer storage compartment 12.

In alternative embodiments, the ice maker is located within the freezer compartment. In this configuration, although still disposed within the freezer compartment, at least the ice maker (and possible an ice bin) is mounted to an interior surface of the freezer door. It is contemplated that the ice mold and ice bin can be separate elements, in which one remains within the freezer compartment and the other is on the freezer door.

The freezer storage compartment 12 is used to freeze and/or maintain articles of food stored in the freezer storage compartment 12 in a frozen condition. For this purpose, the freezer storage compartment 12 is in thermal communication with a freezer evaporator (not shown) that removes thermal energy from the freezer storage compartment 12 to maintain the temperature therein at a temperature of 0° C. or less during operation of the refrigerator 10, preferably between 0° C. and −50° C., more preferably between 0° C. and −30° C. and even more preferably between 0° C. and −20° C.

The refrigerator 10 includes an interior liner 24 (FIG. 2) that defines the fresh food storage compartment 14. The fresh food storage compartment 14 is located in the upper portion of the refrigerator 10 in this example and serves to minimize spoiling of articles of food stored therein. The fresh food storage compartment 14 accomplishes this by maintaining the temperature in the fresh food storage compartment 14 at a cool temperature that is typically above 0° C., so as not to freeze the articles of food in the fresh food storage compartment 14. It is contemplated that the cool temperature preferably is between 0° C. and 10° C., more preferably between 0° C. and 5° C. and even more preferably between 0.25° C. and 4.5° C. According to some embodiments, cool air from which thermal energy has been removed by the freezer evaporator can also be blown into the fresh food storage compartment 14 to maintain the temperature therein greater than 0° C. preferably between 0° C. and 10° C., more preferably between 0° C. and 5° C. and even more preferably between 0.25° C. and 4.5° C. For alternate embodiments, a separate fresh food evaporator can optionally be dedicated to separately maintaining the temperature within the fresh food storage compartment 14 independent of the freezer storage compartment 12. According to an embodiment, the temperature in the fresh food storage compartment 14 can be maintained at a cool temperature within a close tolerance of a range between 0° C. and 4.5° C., including any subranges and any individual temperatures falling with that range. For example, other embodiments can optionally maintain the cool temperature within the fresh food storage compartment 14 within a reasonably close tolerance of a temperature between 0.25° C. and 4° C.

Figure 3:
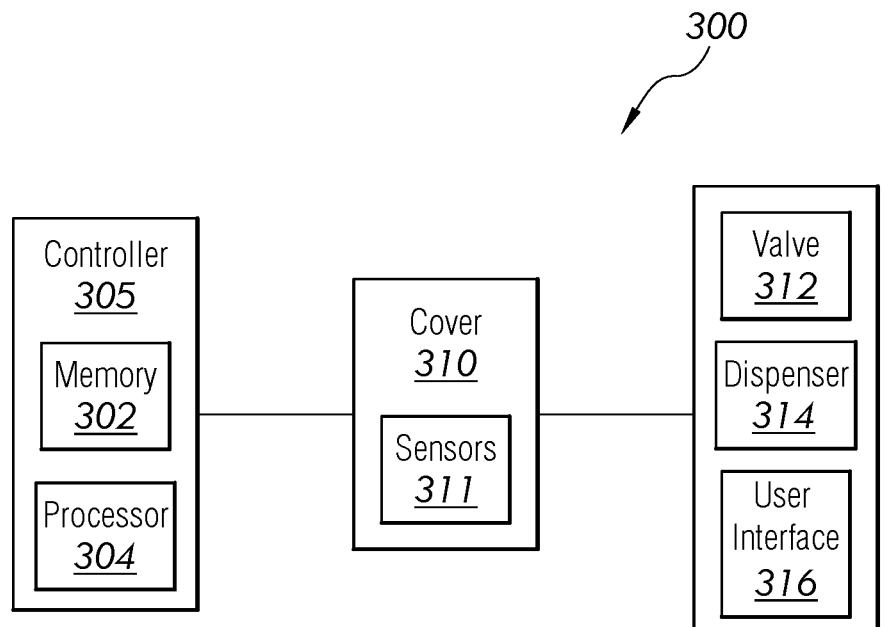
FIG. 3 is a block diagram of a refrigerator appliance according to an exemplary embodiment.

FIG. 3 illustrates a refrigerator appliance 300 according to an example embodiment. Although FIG. 3 illustrates single instances of components of the refrigerator appliance 300, it is understood that the refrigerator appliance 300 may include any number of components. FIG. 3 may reference and incorporate any number of the components explained above with respect to FIGS. 1 and 2.

The refrigerator appliance 300 may include a controller 305, a cover 310, a valve 312, a dispenser 314, and a user interface 316. The controller 305 may include one or more memories 302 and one or more processors 304.

It is understood that the processing circuitry of controller 305 may contain additional components, including processors, memories, error and parity/CRC checkers, data encoders, anticollision algorithms, controllers, command decoders, security primitives and tamper-proofing hardware, as necessary to perform the functions described herein. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into a user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

The memory 302 may be a read-only memory, write-once read-multiple memory or read/write memory, e.g., RAM, ROM, and EEPROM, and the controller 305 may include one or more of these memories. A read-only memory may be factory programmable as read-only or one-time programmable. One-time programmability provides the opportunity to write once then read many times. A write once/read-multiple memory may be programmed at a point in time after the memory chip 302 has left the factory. Once the memory 302 is programmed, it may not be rewritten, but it may be read many times. A read/write memory may be programmed and re-programed many times after leaving the factory. It may also be read many times. The processor 304 may be configured to transmit and receive any type of data to any of components of the refrigerator appliance 300, such as cover 310, valve 312, and dispenser 314. The memory 302 may be configured to store the data.

As noted above, the refrigerator appliance 300 includes a dispenser 18 (FIG. 1) that is configured to dispense at least water, and optionally ice pieces, on an exterior of one of the doors 16 that restricts access to the fresh food storage compartment 14. Alternatively, the dispenser 18 may be located internally within the refrigerated cabinet. The bottom of the dispenser 18 typically includes a sump or drip tray to collect any overflow water and/or melted ice. The refrigerator appliance 300 may include a cover 310 which overlies the sump at the bottom of the dispenser 18. The cover 310 may comprise, for example, a drip tray cover 310 which is configured to hold the vessel to be filled, and is preferably further configured to permit any overflow water and/or melted ice to pass into the sump. In some examples, the drip tray cover 310 may comprise a plurality of sensors 311, such as a plurality of load cells and/or strain gauges.

The plurality of sensors 311 may be configured to detect a weight of a vessel (not shown) and the amount of added water and/or ice dispensed into the vessel in accordance with a value selected by the user.

In operation, a vessel may be placed into a pocket, such as the water dispenser pocket of the refrigerator appliance 300 and will rest upon the drip tray cover 310. It is understood that the vessel may or may not be empty when rested upon the drip tray cover 310. As explained below, prior to dispensing ice and/or water from a dispenser 314, the refrigerator appliance 300 may be configured to zero out a scale (i.e., tare or calibrate the scale) on which a vessel, empty or not empty, has been placed on the drip tray cover 310 to reduce a sensed weight, or stabilized weight, to a zero or no-zero reference value. In some examples, a user may place the vessel into the pocket and on the drip tray cover 310 and under the dispenser 314. In some examples, the drip tray cover 310 may be positioned entirely below the vessel. The user may utilize a user interface to select a desired fill volume, such as a water fill volume. The volume may include, without limitation, an amount of 4 ounces, 6 ounces, 8 ounces, 10 ounces, 12 ounces, 14 ounces, 16 ounces, etc. or other desired value. Optionally, the volume can contain an amount of ice or a combination of ice and water. The refrigerator appliance 300 may be configured to zero out a scale (i.e., tare or calibrate the scale on which an empty vessel has been placed to reduce the sensed weight to zero or other reference value) associated with the drip tray cover 310 prior to dispensing the water by the dispenser 314, and then measure the amount added into the vessel in accordance with a value selected through the user interface by the user. When the refrigerator appliance 300 detects, via the plurality of sensors 311, the correct amount of added water and/or ice in accordance with the value selected by the user, the controller 305 may be configured to disable the valve 312 to avoid overfilling the vessel that exceeds the value selected by the user. In addition, the controller 305 may include an adjustable offset determination to account for the additional water dispensed between when the plurality of load cells or strain gauges reads the desired value selected by the user and when the valve 312 turns off and the water stops flowing. As a consequence, the risk for overflow of the vessel is mitigated and the accuracy of water measured and dispensed is improved. It is understood that the volume available for selection by the user is not limited to these values and that any volume amount may be selected by the user.

The user interface may be further configured to prompt (and receive input responsive thereto) the user to confirm they have placed a vessel of sufficiently-sized volume on the drip tray cover 310. That is, if the vessel is sensed to have an initial weight that exceeds a predetermined threshold which may indicate that the vessel already contains some amount of liquid and/or other items (such as ice cubes or a spoon), or may simply indicate that the vessel is made of a relatively heavy material, the user interface may prompt the user to confirm that the vessel has a sufficient available interior volume to accommodate the selected desired fill volume. In some examples, this prompt may be displayed by the user interface after receiving a selection of the desired fill volume by the user. If an insufficiently-size volume vessel has been placed on the drip tray cover 310, the controller 305 may be configured to generate a corresponding message and flag or otherwise notify the user of the message, which may result in delay or prevention of the dispensing. Still further, the user may override the corresponding message by indicating, via the user interface, that it would nevertheless still desire to proceed with the dispensing (despite having place an insufficiently-sized volume vessel), in which case the controller 305 may be further configured to thereby dispense the ice and/or water from the dispenser 314 into the vessel.

In some examples, the plurality of sensors 311 may include at least two load cells that are configured to measure the weight of the vessel. It is further understood that the plurality of sensors 311 may alternatively include at least three load cells or at least four load cells (or optionally, even more load cells). The plurality of load cells may be integrated into one or more surfaces of the drip tray cover 310. For example, the one or more surfaces may include a bottom surface of the drip tray cover 310. The one or more surfaces of the drip tray cover 310 may include a flat surface, a sloped surface, a surface with drain holes, and/or any combination thereof. In some examples, the plurality of sensors 311 may be formed in pockets on the bottom surface of the drip tray cover 310. For example, the plurality of sensors 311 may be formed in pockets that may be located on the underside of the drip tray cover 310. In some examples, the plurality of sensors 311 may instead be located at a bottom surface of a housing of dispenser 314. When the vessel is placed upon the drip tray cover 310, the plurality of sensors 311 may be configured to automatically sense the vessel and the added water and/or ice weight, such as the amount of water and/or ice pieces selected by the user in accordance with the desired fill value. For example, upon placement of the vessel upon the drip tray cover 310, the plurality of load cells may be configured to sense the strain due to deflection of the drip tray cover 310. In some examples, the drip tray cover 310 may be configured to include the plurality of sensors 311 and also be evenly shaped to avoid poor calibration and inaccurate measurements. Moreover, the drip tray cover 310 may be configured to include an area, such as a flat area, that is integrated with the plurality of sensors 311, such as the plurality of load cells or strain gauges. In some examples, the strain gauges may be placed on the bottom surface of the drip tray cover 310 and spaced apart by a gap. The gap may be dependent on the shape and size dimensions of the drop tray cover 310.

The refrigerator appliance 300 may include a valve 312, such as a water valve, and a dispenser 314, such as a material dispenser. The dispenser 314 may be configured to dispense material, the material including liquid, ice, or any combination thereof. The dispenser 314 may refer to the dispenser 18, as previously explained above. In some examples, the dispenser for water may be different from an ice dispenser device for ice pieces. In some examples, the valve 312 and the dispenser 314 may be actuated by the controller 305. The refrigerator appliance 300 may include a user interface 316. The user interface 316 may be configured to display and receive the one or more selections. Further, the input of the one or more selections may include biometric input, haptic input, or any combination thereof.

Figure 4:
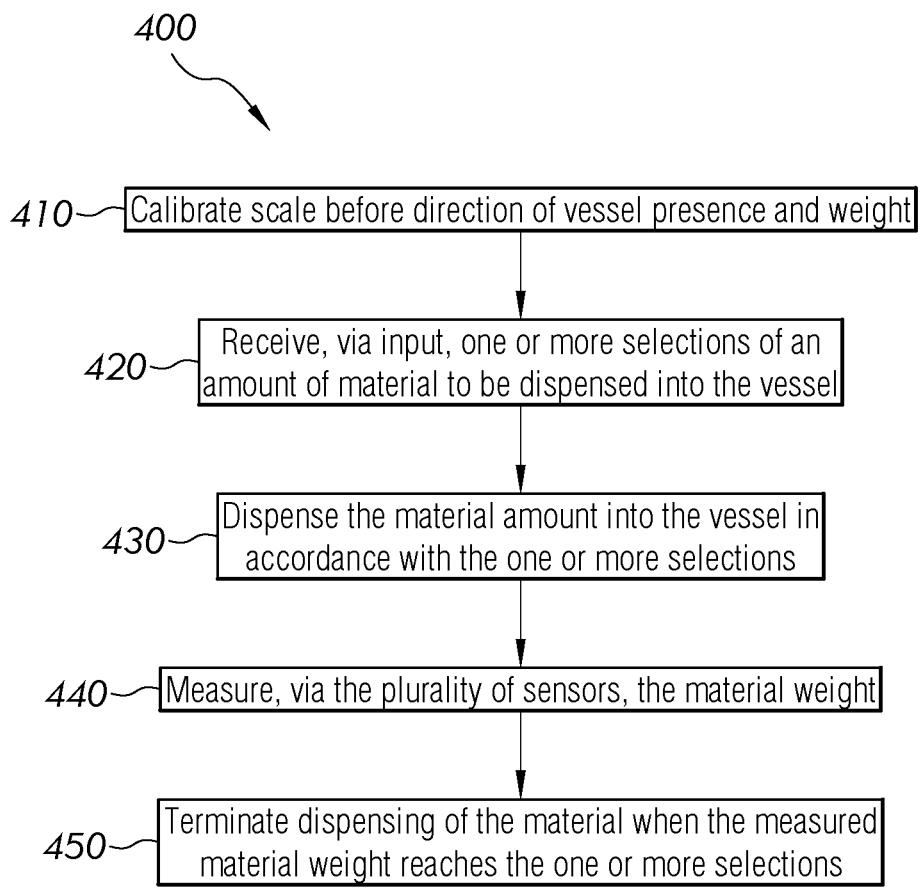
FIG. 4 is a method for automatic material dispensing according to an example embodiment.

FIG. 4 illustrates a method 400 for automatic material dispensing according to an example embodiment. FIG. 4 may reference and incorporate any number of the components explained above with respect to FIGS. 1 and 2 and 3.

At block 410, the method 400 may include detecting the presence and weight of a vessel. For example, a plurality of sensors may be configured to detect the weight of a vessel prior to a dispensing operation. For example, prior to the dispensing operation, the method may include zeroing out a scale (i.e., taring or calibrating the scale on which an empty vessel has been placed to reduce the sensed weight to zero or other reference value) associated with a drip tray cover prior to dispensing water by a dispenser (and/or ice pieces by an ice dispenser device), and then measure the amount added of the water and/or ice pieces into the vessel in accordance with a value selected by the user. At block 420, the method 400 may include receiving, via input from a user interface, one or more selections of an amount of material to be dispensed in the vessel. For example, the one or more selections may be received by a controller, and the one or more selections may be indicative of an amount of material to be dispensed into the vessel. Without limitation, the material may include liquid, ice, or any combination thereof. At block 430, the method 400 may include actuating a valve to begin dispensing, via a dispenser, water to be dispensed in the vessel in accordance with the one or more selections. For example, the controller may be configured to actuate a valve to begin dispensing of the water into the vessel by a dispenser. Alternatively or additionally, ice pieces may be dispensed, via an ice dispenser device, into the vessel. In this manner, dispensing of water and/or ice pieces into the vessel is achieved based on the one or more selections. At block 440, the method 400 may include measuring, via a plurality of sensors, the material that is dispensed in the vessel by the dispenser and/or ice dispenser device in accordance with the one or more selections. In some examples, the plurality of sensors may be configured to continuously sense the water and/or ice pieces during the filling operation of the vessel. At block 450, the method 400 may include disabling the valve and/or ice dispenser device after the vessel receives the water by the dispenser and/or ice pieces by the ice dispenser device in accordance with the one or more selections. For example, the controller may be configured to disable, after the vessel receives the amount of water in accordance with the one or more selections, the valve to terminate dispensing of the material into the vessel. In some examples, the controller may be configured to stop filling of the vessel with water and/or ice pieces when the sensed weight of this added material reaches or otherwise equates to the one or more selections.

Figure 5D:
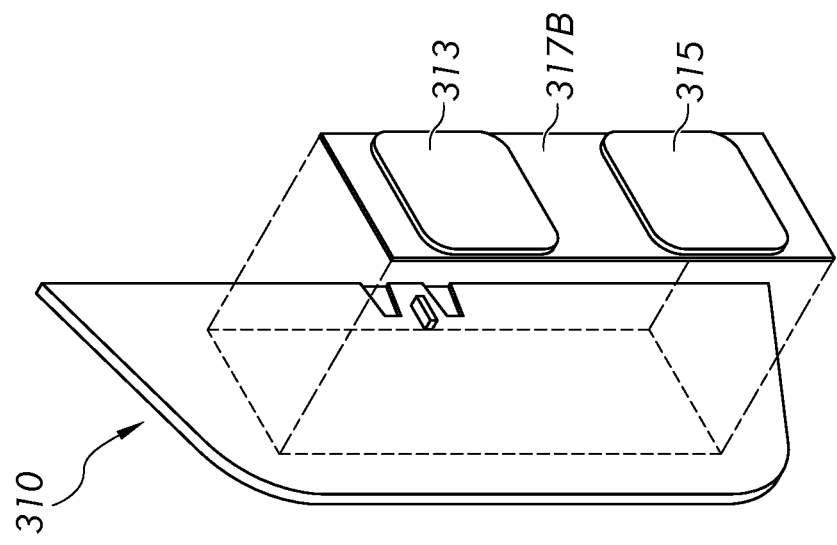
FIG. 5D is a bottom plan view of a cover according to another example embodiment.
Figure 5C:
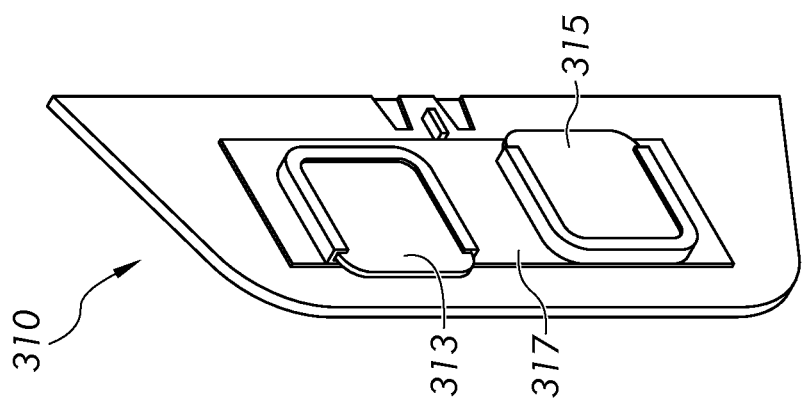
FIG. 5C is a bottom plan view of a cover according to another example embodiment.

FIGS. 5A-5C illustrate a drip tray cover 310 located at a bottom of the dispenser 18 housing, according to an example embodiment. The drip tray cover 310 may refer to the drip tray cover as previously explained. Without limitation, the shape and/or size of the drip tray cover 310 may be configured to be appropriately sized for the housing of dispenser 314. As illustrated in FIG. 5A, the drip tray cover 310 may include various profiles corresponding to the dispenser housing, such as a wedge-shaped design with one or more tapered side portions. FIG. 5A illustrates a top plan view of the drip tray cover 310. Preferably, the drip tray cover 310 is of sufficient size to receive the vessel to be filled by the dispenser 18. As illustrated in FIG. 5B, which illustrates a bottom plan view, the drip tray cover 310 may include a sensor mounting area 317 which comprises a plurality of mounts for respective plurality of sensors 311, such as a first load cell 313 and a second load cell 315. The drip tray cover 310 may include a first load cell 313 that is mounted in a pocket that is located on an underside of the drip tray cover 310 and disposed in a first direction and opposite to a second direction of a second load cell 315 that is mounted in another pocket that is located on the underside of the drip tray cover 310. In some examples, the first direction of the first load cell 313 may be different (for example, by a predetermined rotation or any other orientation) from the second direction of the second load cell 315. In some examples, the first load cell 313 and the second load cell 315 may be located in the same pocket that is located on the underside of the drip tray cover 310. In some examples, the first load cell 313 may be disposed in an opposite direction to that of the second load cell 315. The load cells 313, 315 may be retained within their respective pockets by a mechanical press-fit or locking mechanism, and/or may be retained by an adhesive or glue. Preferably, the pockets of the sensor mounting area 317 are secured to an underside of the drip tray cover 310 so as to enable to the load cells 313, 315 to directly measure any deflection of the drip tray cover 310 caused by the vessel. Most preferably, the pockets are formed integrally with the underside of the drip tray cover 310, for example, by being injection molded together with the drip tray cover 310.

As illustrated in FIG. 5C, which shows a bottom perspective view, the drip tray cover 310 illustrates a plurality of mounts for a respective plurality of sensors 311, such as a first load cell 313 and a second load cell 315. The drip tray cover 310 may include a first load cell 313 that is mounted in a pocket that is located on the underside of the drip tray cover 310 and disposed in a first direction and parallel to a second direction of a second load cell 315 that is mounted in another pocket that is located on the underside of the drip tray cover 310. It is understood that the drip tray cover 310 may be designed to any shape and/or size. The first load cell 313 and the second load cell 315 may be mounted to pockets located on the bottom surface of the drip tray cover 310, such as on the underside of the drip tray cover 310, so as to move with the flexure of the drip tray cover 310 due to the strain exerted by the vessel placed thereupon and/or sensed material, such as the water and/or ice pieces, that is dispensed into the vessel. In some examples, the first load cell 313 and the second load cell 315 may be disposed in the same direction as each other. In any of the above examples, the plurality of load cells 313, 315 may be integrated into one or more slots in the bottom surface of the drip tray cover 310. Without limitation, the plurality of load cells 313, 315 may be configured to slide into the one or more slots of the bottom surface of the drip tray cover 310, snap into the one or more slots of the bottom surface of the drip tray cover 310, mold into the one or more slots of the bottom surface of the drip tray cover 310, and/or any combination thereof.

Still further, an alternative example construction is illustrated in FIG. 5D. The sensor mounting area can be configured whereby the plurality of load cells 313, 315 are secured to a rigid plate 317B (including but not limited to a metal plate) by material, including but not limited to an adhesive (e.g., epoxy or the like), and the plate 317B may be securely installed on the drip tray cover 310, as illustrated in FIG. 5D. In some examples, the plurality of load cells 313, 315 may be directly attached to the plate 317B by the adhesive, instead of utilizing a slide-in slot structure as illustrated in FIG. 5C. The plate 317B may then be secured to the bottom surface of the drip tray cover 310. The flexure of the drip tray cover 310, due to the vessel placement thereon, will cause the plate 317B to subsequently bend and/or flex, and this induced bend/flex may be sensed as strain by the load cells.

Figure 6:
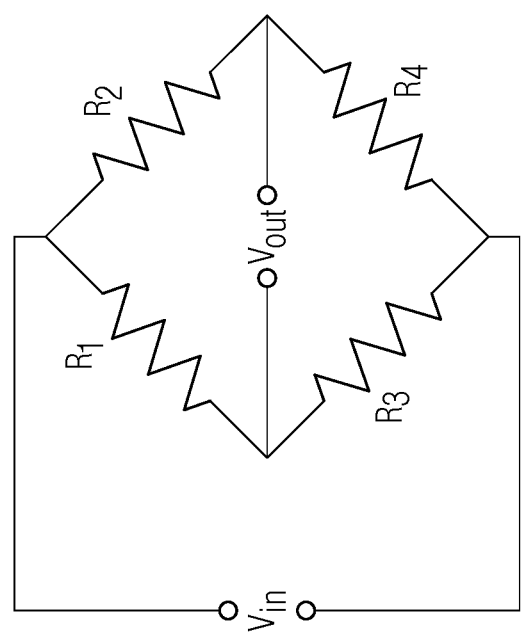
FIG. 6 is a schematic of one measurement circuit according to an example embodiment.

FIG. 6 depicts a schematic of one example circuit configured to measure the weight of a vessel. The circuit may comprise a Wheatstone bridge. The weight may be calculated by first determining an output voltage, Vout. The output voltage, Vout, may be determined by Vout=[(R2/R2+R4)−(R3/R1+R3]*Vin, where R1, R2, R3, and R4 are resistors (whose values may be dependent on the plurality of sensors 311) and Vin is the input voltage. The output voltage, Vout, is then multiplied by the maximum weight capacity to derive a value X. Finally, the weight is determined by dividing X by (the strain gauge sensitivity multiplied by the strain gauge excitation voltage). During operation, a strain gauge value may be input to the controller 305.

The controller 305 may be configured to zero out a scale (i.e., tare or calibrate the scale) and further be configured to start and/or stop dispensing (by the dispenser 314) of ice and/or water based on the received input. The dispensing (or filling) into the vessel may be timed and based on input received from the strain gauge, and the dispensing (or filling) may be delayed by a delta value after the valve 312 has been shutoff.

The invention has been described with reference to the example embodiments described above. Modifications and alterations will occur to others upon a reading and understanding of this specification. For instance, the crisper assemblies described herein may be adapted for placement in different refrigerator configurations (e.g., French-door, Top mount, Bottom mount). It is also contemplated that the crisper assemblies may be modified such that two or more crisper assemblies may be placed in a side-by-side arrangement relative to each other. Example embodiments incorporating one or more aspects of the invention are intended to include all such modifications and alterations insofar as they come within the scope of the appended claims and their equivalents.

What is claimed is:

1. A refrigerator appliance (10, 300) comprising:
   a drip tray cover (310) comprising two strain gauge sensors (311) that are coupled to a bottom surface of the drip tray cover (310) to move together therewith;
   a memory (302); and
   a controller (305), wherein the controller (305) is configured to:
      detect, via the two strain gauge sensors (311), a weight of a vessel on the drip tray cover (310) based on a strain experienced by the drip tray cover (310),
      receive, via input from a user, one or more selections, the one or more selections indicative of an amount of material to be dispensed into the vessel, the material including liquid, ice, or any combination thereof,
      dispense the material in accordance with the one or more selections,
      continuously measure, via the two strain gauge sensors (311), the amount of material being dispensed in accordance with the one or more selections, and
      terminate, after the vessel receives the amount of material that is measured and equivalent to the one or more selections, the dispensing of the material into the vessel.

2. The refrigerator appliance (10, 300) according to claim 1, wherein the two strain gauge sensors are mounted in respective pockets of the bottom surface of the drip tray cover (310).

3. The refrigerator appliance (10, 300) according to claim 1, wherein the controller (305) is further configured to, prior to dispensing the material in accordance with the one or more selections, reduce a sensed weight associated with the drip tray cover (310) that measures the weight of the vessel to zero or other reference value.

4. The refrigerator appliance (10, 300) according to claim 1, wherein the controller (305) is further configured to actuate a valve (312) to begin dispensing of water into the vessel in accordance with the one or more selections.

5. The refrigerator appliance (10, 300) according to claim 1, further comprising a dispenser (314) and an ice dispenser device that are located in a pocket and are also disposed above drip tray cover (310).

6. The refrigerator appliance (10, 300) according to claim 1, wherein a first strain gauge sensor (313) is disposed in an opposite direction to a second strain gauge sensor (315).

7. The refrigerator appliance (10, 300) according to claim 1, wherein a first strain gauge sensor (313) is disposed in the same direction as a second strain gauge sensor (315).

8. The refrigerator appliance (10, 300) according to claim 1, further comprising a user interface (316) that is configured to display and receive the one or more selections.

9. The refrigerator appliance (10, 300) according to claim 1, wherein the input of the one or more selections includes biometric input, haptic input, or any combination thereof.

10. A method of automatic material dispensing, comprising:
    detecting, via two strain gauge sensors (311), a weight of a vessel on a drip tray cover (310) based on a strain of the drip tray cover (310), the two strain gauge sensors (311) coupled to a bottom surface of the drip tray cover (310),
    receiving input of one or more selections, the one or more selections indicative of an amount of material to be dispensed into the vessel, the material including liquid, ice, or any combination thereof;
    dispensing the material in accordance with the one or more selections;
    continuously measuring, via the two strain gauge sensors (311), the amount of material being dispensed in accordance with the one or more selections; and
    terminating, after the vessel receives the amount of material that is measured and equivalent to the one or more selections, the dispensing of the material into the vessel.

11. The method according to claim 10, wherein the two strain gauge sensors are mounted in respective pockets of the bottom surface of the drip tray cover (310).

12. The method according to claim 10, further comprising, prior to dispensing the material in accordance with the one or more selections, reducing a sensed weight associated with the drip tray cover (310) that measures the weight of the vessel to zero or other reference value.

13. The method according to claim 10, further comprising at least one of: dispensing water by a dispenser (314), and dispensing ice pieces by an ice dispenser device.

14. The method according to claim 10, further comprising actuating a valve (312) to begin the dispensing, by a dispenser (314), of water into the vessel in accordance with the one or more selections.

15. The method according to claim 10, wherein a first strain gauge sensor (313) is disposed in an opposite direction to a second strain gauge sensor (315).

16. The method according to claim 10, wherein a first strain gauge sensor (313) is disposed in the same direction as a second strain gauge sensor (315).

17. The method according to claim 13, wherein the drip tray cover (310) is arranged above a sump that is located at a bottom of the dispenser (314).

18. The method according to claim 10, further comprising displaying and receiving the input of the one or more selections via a user interface (316).

19. The method according to claim 10, wherein the input of the one or more selections includes biometric input, haptic input, or any combination thereof.

20. A non-transitory computer readable storage medium comprising computer program code instructions, being executable by a computer, for:
    detecting a weight of a vessel on a drip tray cover (310) via two strain gauge sensors (311) based on a strain of the drip tray cover (310), the two strain gauge sensors (311) coupled to a bottom surface of the drip tray cover (310) via a metal plate (317);

receiving input of one or more selections, the one or more selections indicative of an amount of material to be dispensed into the vessel, the material including liquid, ice, or any combination thereof;

dispensing the material in accordance with the one or more selections;

continuously measuring the amount of material being dispensed in accordance with the one or more selections; and terminating, after the vessel receives the amount of material that is measured and equivalent to the one or more selections, the dispensing of the material into the vessel.

* * * * *